Patented May 13, 1941

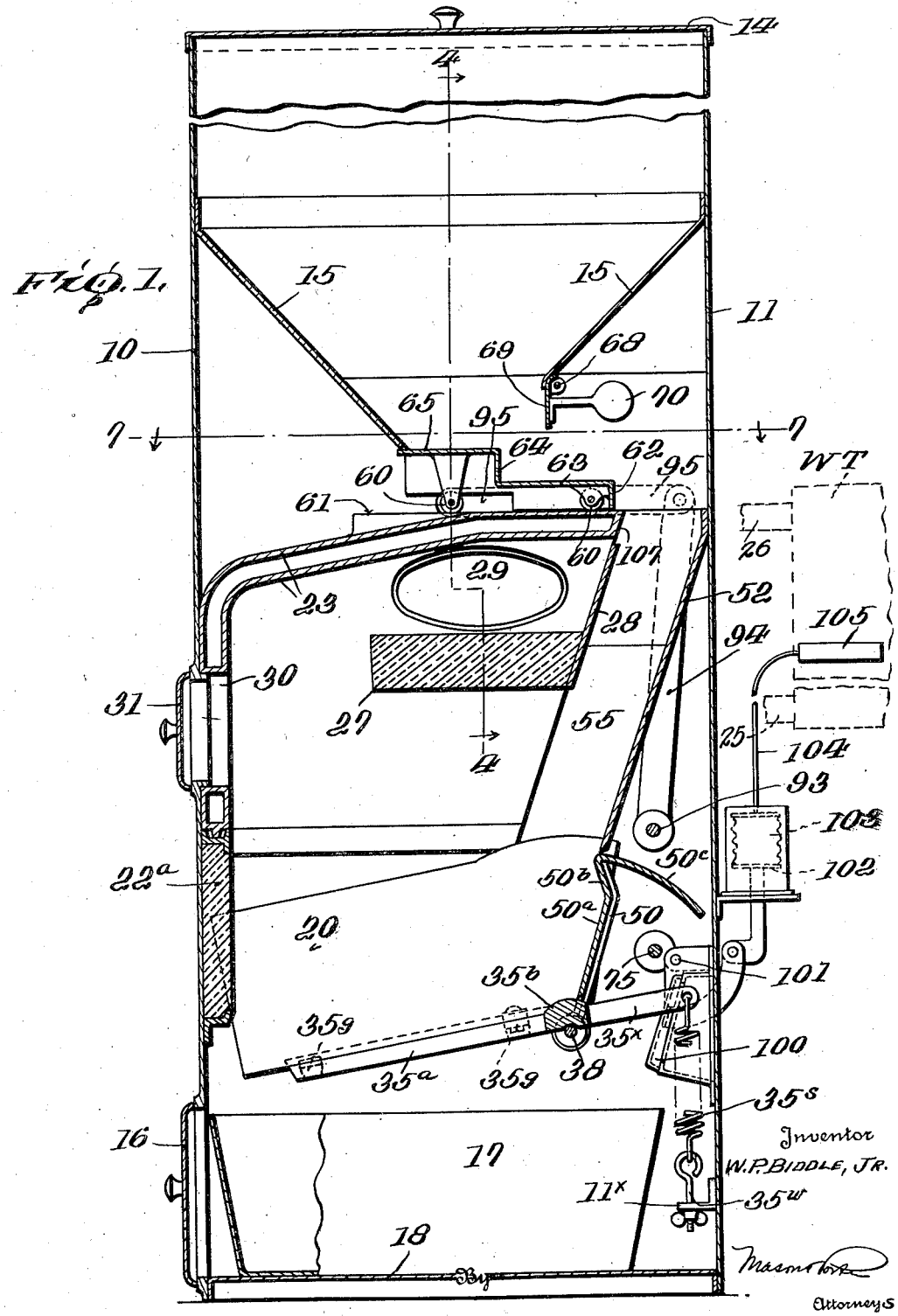

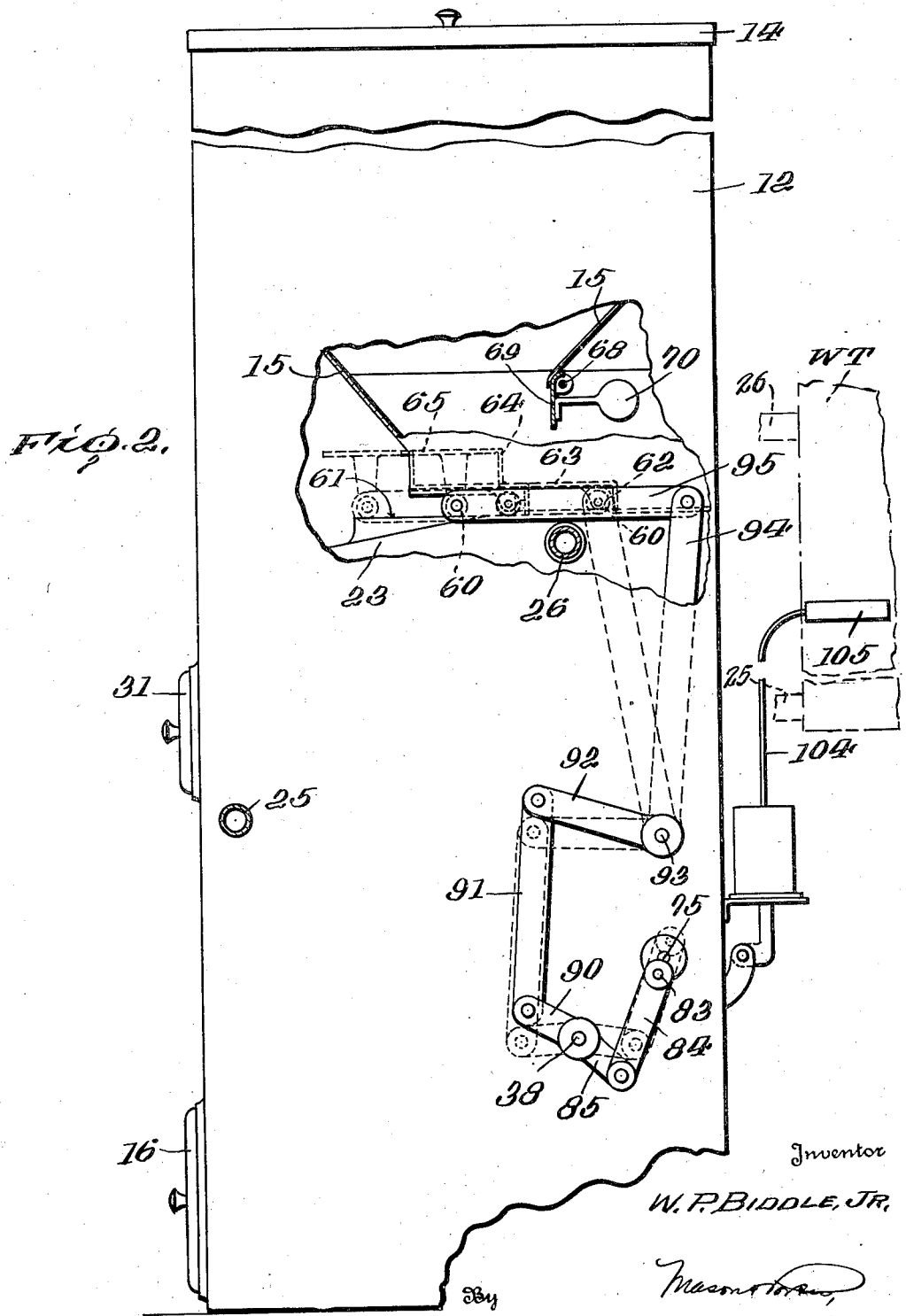

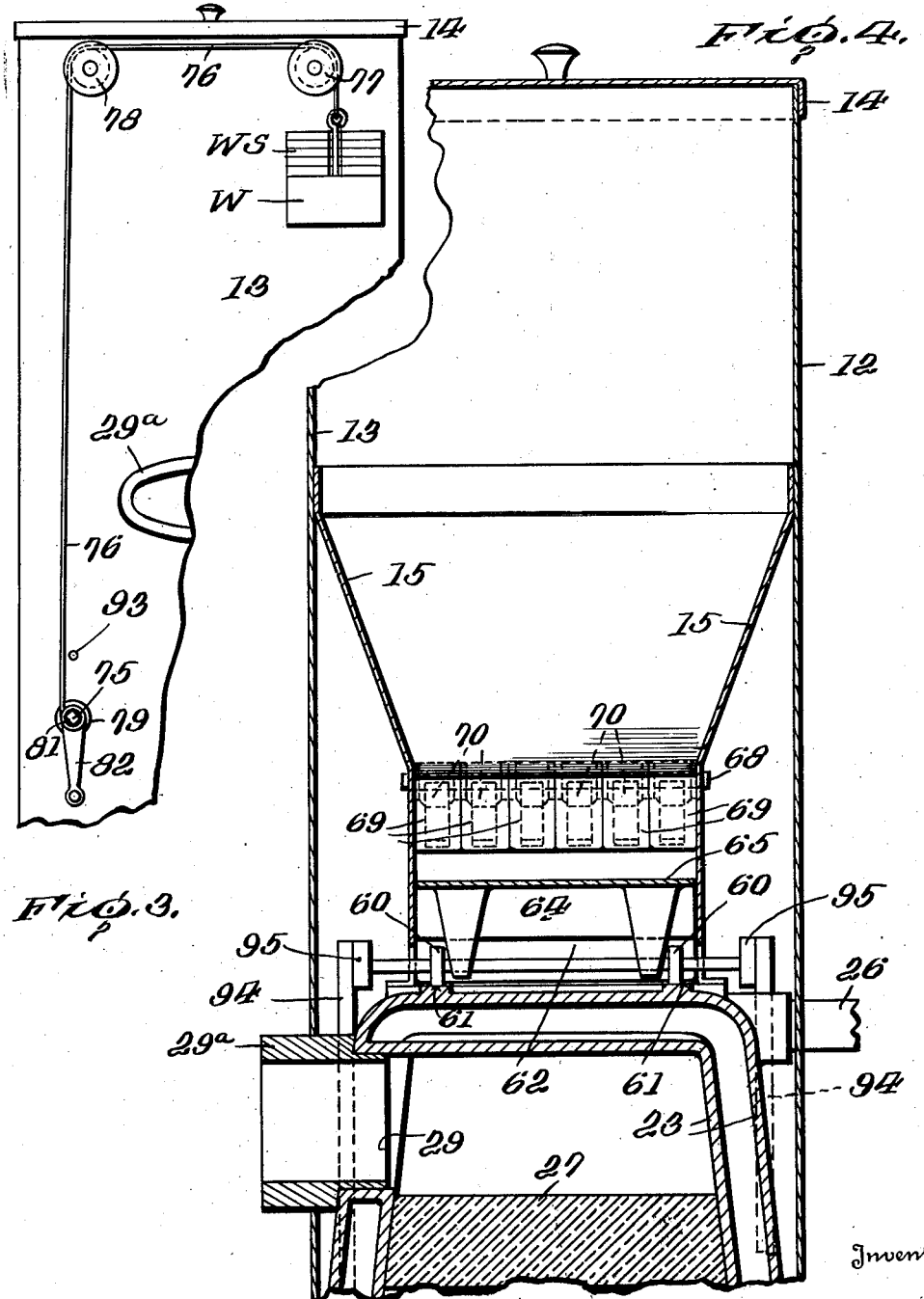

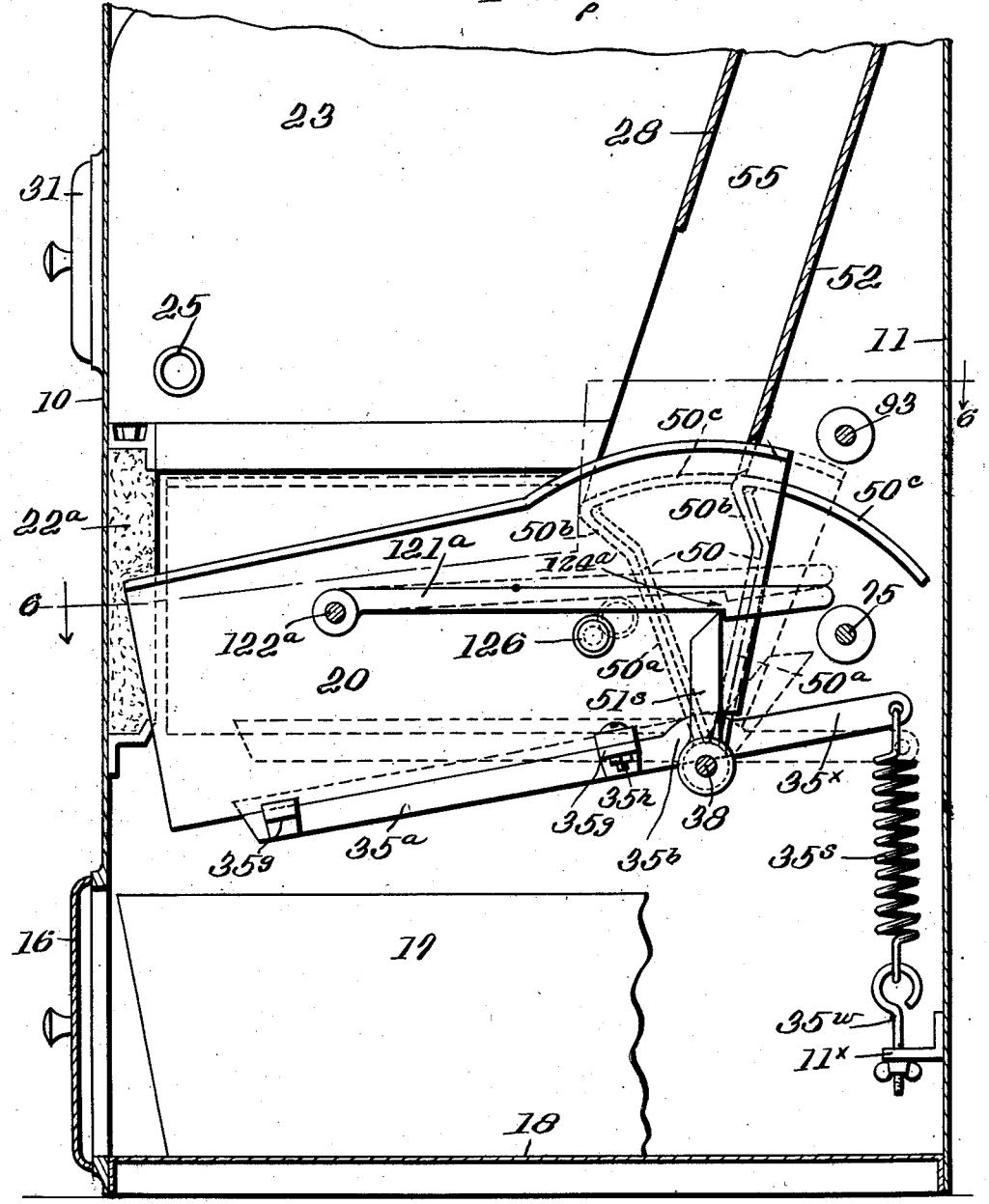

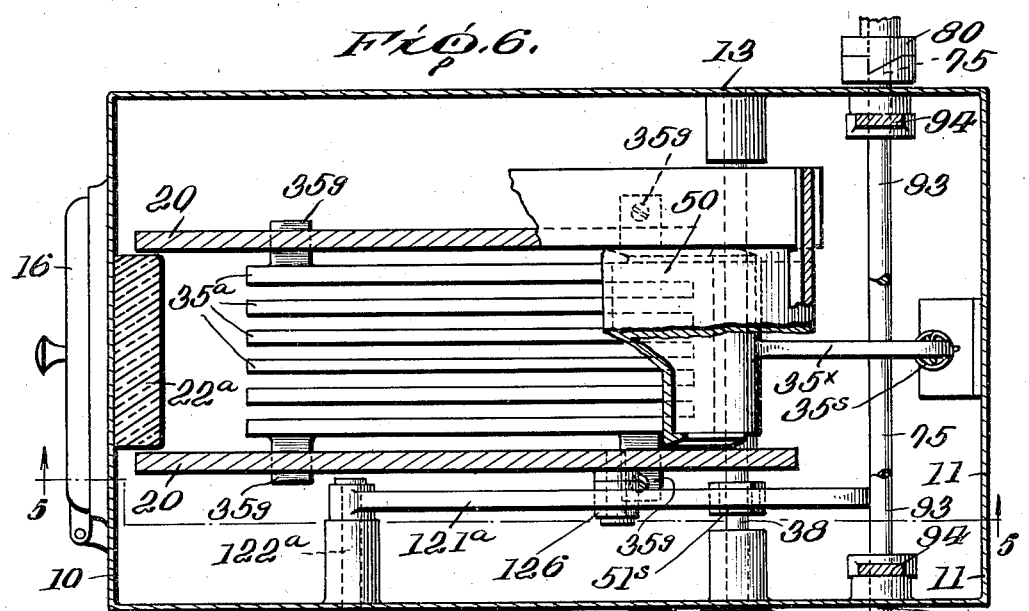
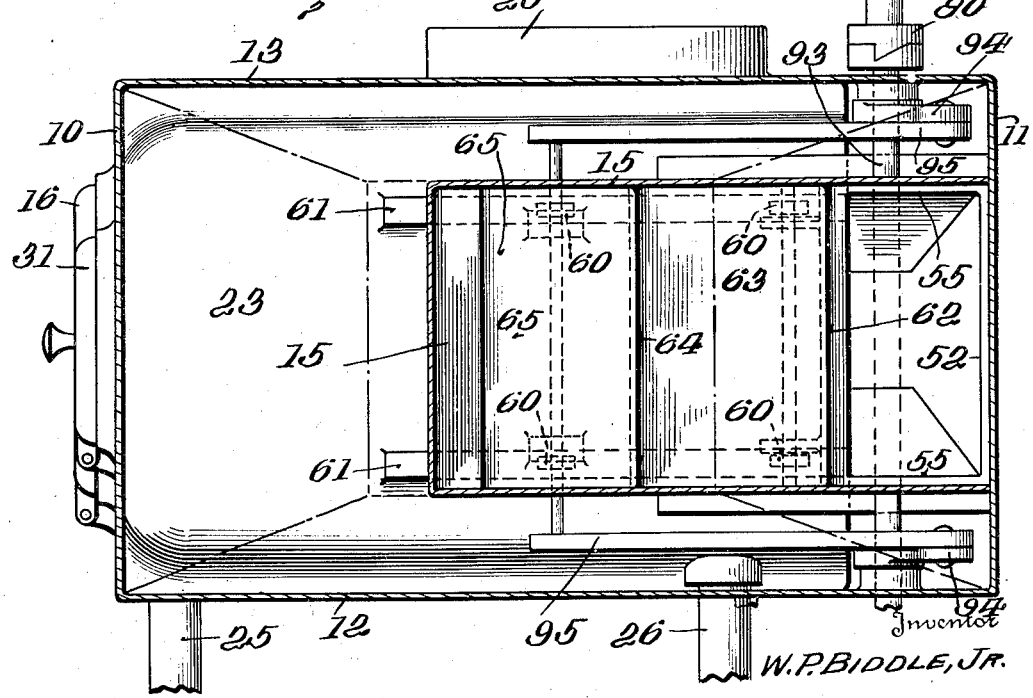

2,241,390

UNITED STATES PATENT OFFICE 2,241,390

FURNACE WITH AUTOMATIC FUEL CONTROLLING AND SUPPLYING MEANS

William P. Biddle, Jr., Knoxville, Tenn., assignor to Knox Stove Works, Knoxville, Tenn., a corporation of Tennessee Application March 23, 1937, Serial No. 132,578

12 Claims. (Cl. 110—109)

This invention relates to a furnace having automatic means for supplying fuel thereto and for controlling the delivery of this fuel.

One of the features of the present invention is the employment of a fuel supplying means which delivers a predetermined amount of fuel at time intervals in accordance with the demand of the furnace for fuel.

Another feature of the present invention is the provision of a fuel feeding means for preparing and delivering a predetermined quantity of fuel.

A further feature of the present invention is the provision of devices for avoiding clogging of a fuel feeding structure by reason of lumps in the fuel supply.

Still another feature of the present invention is the provision of a furnace having a combustion chamber and means for advancing fuel into and through said chamber and including a pusher member of particular construction in association with means for moving said pusher member whereby clogging and false blocking may be avoided.

Other features of the invention reside in details of construction and assemblies as will appear more fully in the course of the following specification and claims, and in reference to the accompanying drawings, which illustrate one form of construction according to the present invention.

In these drawings:

Fig. 1 is an upright sectional view through a furnace and feeding structure.

Fig. 2 is a corresponding side elevation, with parts broken away.

Fig. 3 is a fragmentary elevation of the opposite side.

Fig. 4 is an upright sectional view through a part of the feeding means, on an enlarged scale and substantially on line 4—4 of Fig. 1.

Fig. 5 is an upright sectional view, at an enlarged scale, substantially on line 5—5 of Fig. 6.

Fig. 6 is a horizontal sectional view, substantially on lines 7—7 of Fig. 1.

Fig. 7 is a horizontal sectional view, substantially on lines 7—7 of Fig. 1.

In these drawings, the invention is illustrated in conjunction with a small stove employed for heating water. This stove has an outer casing comprising the front wall 10, the rear wall 11, and the side walls 12 and 13. The upper part of this casing is constructed and arranged to provide a hopper for receiving the supply of fuel, and is normally closed by a cover 14. Within this upper portion of the casing are provided the hopper walls 15 having a bottom opening through and from which the coal is supplied to the furnace grate.

At the bottom of the furnace, the front wall is provided with a sealed ash pit door 16 to afford access for removal of the ash pan 17, which can be slid along the closing bottom wall 18.

The furnace structure proper, in this illustrative form, includes side walls 20 and a dome structure sealed to the fire pot walls, and comprising inner and outer walls 23 which define a water jacket having an appropriate water inlet connection 25 near its lowest point, and a water outlet connection 26 near its highest point (see Figs. 2 and 7). A refractory baffle 27 extends from side to side of the dome structure, with its front edge spaced from the front of the dome structure, and having its rear edge extending to a cross-wall 28 forming a part of the fuel delivery channel, as will be described hereinafter. A lateral opening 29 extends from the interior of the dome structure at a point above the baffle 27 to an outlet flue 29a for combustion gases. The front of the dome structure preferably has an opening 30 which is normally closed by a sealing door 31; this door may be opened for inserting kindling in starting the furnace.

The fire pot, within which the fuel burns, comprises a plurality of individual grate bars 35a which are connected together by a web structure 35b preferably integral therewith, and from which extends a lever arm 35x. The web structure 35b has a transverse groove for fitting around a transversely extending rod 38, so that the fire pot may rock about the axis of this rod. The side walls 20 rest upon laterally extending lugs 35g of the side fire bars 35a, and are secured thereto by suitable means such as the bolts 35h. Thus, the fire pot, comprising the side walls and the fire bars, is capable of rocking movement about the axis of the rod 38. The front end of this rockable fire pot structure is open, the side walls 20 extending into overlapping relation with the end wall member 22a. The fire bars 35a terminate short of this end wall member 22a, leaving a space through which clinkers and the larger chunks of debris may be discharged into the ash receiver 17.

The lever 35x is engaged with one end of a balancing spring 35s: the other end of this spring being engaged with an eye-bolt 35w which may be adjusted with respect to the bracket 11x secured to the casing wall 11. This adjustment is so made that the weight of the fire pot structure, with a normal maximum charge of fuel therein, is sufficient to cause the structure to rock in a counterclockwise direction about the axis of rod 38; while the power of the spring 35s is effective to return the fire pot structure by a clockwise rocking movement when a predetermined minimum torque is exerted by the presence of a lesser quantity of fuel and ash in the fire pot proper.

The rod 38 has an upstanding detent arm 51s secured thereto. A pivot 122a on a side wall 12 of the casing receives a latch lever 121a having a shoulder 124a thereon, this shoulder being adapted to engage the arm 51s and prevent clockwise movement thereof. The fire pot structure includes a projecting lug 126, illustrated as bearing a pivoted roller, which is moved in a path for engagement with the detent lever 121a for raising the same out of engagement with the arm 51s when the fire pot structure is in its upper or "minimum fuel" position: this lug being moved downward with the fire pot structure when the greater load of fuel is present, and permitting the detent lever 121a to engage and lock the arm 51s.

Likewise secured to the rod 38 is a pusher plate 50 which has a face 50a that extends in a plane substantially radial with respect to the axis of rod 38; a forwardly inclined portion 50b merging with the upper edge of the surface 50a; and an arcuate top structure 50c which is concentric with the axis of rod 38. This pusher plate 50 extends from one side wall member 20 to the opposite side wall member 20, the edges of the member 50 being beveled (Fig. 6) so that the maximum width at each transverse plane parallel to the axis of rod 38 thereof is closely adjacent the front surfaces 50a, 50b. At the lower edge of the surface 50a, the pusher member 50 is likewise beveled (Fig. 1), and the upper surface of the web 35b is arcuate so that a close engagement of the forward edge of the member 50 is feasible. The beveling at the sides and bottom of the member 50 is provided to avoid blocking by the pinching of small particles of fuel between this member and the side walls 20 or the arcuate surface of the web 35b, during the movement of the pusher member.

The fuel is supplied into the fire box by movement through a chute provided by the walls 28, 52, 55. The wall 52 terminates closely adjacent to and in substantial alignment with the pusher plate 50, when the latter is in its retracted position, so that fuel descending through this fuel supply channel is delivered immediately in front of the pusher plate 50 and relatively behind fuel material already present in the fire pot. It will be noted that it is preferred to bevel the lower edge of the wall 52 to prevent pinching of fuel between this lower edge and the arcuate portion 50c of the pusher plate. The wall equipments 28, 52 and 55 forming the gravity delivery chute or fresh fuel drop guide serve to separate the magazine 15 from the fuel pot by a free air space of considerable depth. The water jacketing 23 also serves as an insulating separator.

The automatic supply means for delivering fuel into the fuel supply channel comprises a feeding carriage mounted on the rollers 60, which travel along a smooth top surface 61 provided on the dome. This carriage comprises a first upright pusher wall 62, a lower fuel-supporting wall 63, a second upright pusher wall 64, and an upper fuel supporting wall 65. The upper supporting wall 65 closely engages the lower edges of the hopper wall 15 beneath which it moves. In the extreme right-hand position of the carriage, as shown in Fig. 1, the first pusher wall 62 is presented closely adjacent the upper opening of the fuel supply channel. In the withdrawn or extreme left-hand position of the carriage, as shown in dotted lines in Fig. 2, the second pusher wall 64 is closely adjacent the lower edge of the left-hand inclined hopper wall 15. The right-hand hopper wall 15 (Fig. 1) terminates at a relatively great distance above the surface of the supporting wall 65. A part of this space is closed off by movable flaps 69 which provide a pivoted gate for restricting the movement of fuel out of the hopper, during the course of carriage movements. These flaps 69 are supported by a pivot 68 mounted on the fixed structure, and each is provided with a counterweight 70 which is capable of opposing movement of the corresponding flap under the gravitational pressure of fuel contained in the hopper, but permits the movement of the corresponding flap in the event that a large chunk or lump is present in the fuel, in order to avoid blocking of the power feeding effect during the movement of the carriage toward the right.

The structure is made effective by exerting, upon a shaft 75, a torque which preferably is substantially constant. In the illustrated form, this torque is produced by the action of a weight W which may be increased for regulation by the small supplemental weights Ws. A cable 76 extends over the pulleys 77 and 78, and engages around a drum 79 which is mounted on the shaft 75 (Fig. 3). This drum 79 is preferably formed for relative rotation about the axis of shaft 75, and has a clutch 80 for driving the shaft 75 under the urgency of the height W. The drum 79 further is provided with a squared end 81 which may be engaged by a separable crank 82 for the purpose of rewinding the structure, under which conditions the clutch 80 permits the rewinding without rotative movement of the shaft 75.

The rotation of shaft 75, as shown in Fig. 2, causes the eccentric pin 83 to reciprocate the link 84 which is connected to the arm 85 of the lever which is fixed to the rod 38, and thereby produces successive oscillation movements of the pusher plate 50.

In this illustrative form, the lever arm 85 is also connected to a further arm 90 which is joined by a link 91 to a crank arm 92 which is fixed to rod 93 which is provided within the casing with a pair of arms 94 which extend upwardly at either side of the feed carriage and are connected thereto by the links 95.

The operation of this structure is as follows:

A kindling fire may be built directly upon the fire bars 35a, by opening the door 31 and inserting the necessary matter and igniting it. The hopper is assumed to contain a sufficient supply of coal, which may be of a commercial size such as chestnut. The crank 82 is employed to wind the windlass and raise the weight W. It is usually preferred to insert some coal directly upon the kindling, in the usual way, in starting the fire.

The weight W produces a torque on the shaft 75 tending to move the same in a clockwise direction in Fig. 3 and a counterclockwise direction in Figs. 1 and 2. Thus, a counterclockwise rocking effect is produced at the lever 85 tending to turn the rod 38 in a counterclockwise direction. As the contents of the fire pot burn away, the pressure plate 50 is permitted to rock under the torque effect at the rod 38. At the same time, also, the link 91 is pulled downward and the arms 94 moved in a counterclockwise direction (Fig. 2), so that the feeding carriage is pushed toward the left in these figures, to a position in which it receives a fresh supply of fuel, due to the leftward movement of the upright wall 64 to a position beneath the lower edge of the left-hand hopper wall 15.

Ultimately, this forward movement of the pusher plate 50 and counterclockwise movement of the rod 38 terminates, when the pin 83 has been shifted by shaft 75 to the extreme limit of stroke. By reason of the torque being applied to the shaft 75, the pin 83 then is given a movement which is rapid as the motion of the pusher plate 50 in a clockwise direction, Figs. 1 and 2, is not opposed by fuel congestion in the fire box amounting to substantially half a revolution of the shaft 75, as a result of which the pusher plate 50 is moved back to the full line position of Fig. 1, and simultaneously the feeding carriage is moved to the right in Figs. 1 and 2, so that any fuel in front of the wall 62 is pushed into the supply channel, and falls downward into the fire pot, behind the mass of fuel already in the latter. It is to be understood that successive back and forth movements of the plate 50 may take place until the weight of the fuel mass in the fire box becomes sufficient to depress the forward or free end of the fire pot as illustrated in full lines in Fig. 5. Thus each retraction of the plate is rapid because it is not opposed by fuel mass contact, but at times other than during initiation of a fresh fuel feeding cycle, plate movement in the counterclockwise direction is opposed by fuel mass contact to a greater or lesser extent, and therefore, is slower, and during the normal fuel burning function is definitely limited to respond directly to the rate of combustion of fuel in the fire pot. During the clockwise movement of the pusher plate 50 toward the full line position of Fig. 1 or the dash line position of Fig. 5, any fuel which comes upon the top wall 50c is immediately stripped therefrom by the lower edge of the channel wall 52, so that it also falls into the fire pot. Thus, at the completion of each quick retraction of the plate 50, a fresh supply of fuel is introduced into the fire pot at a position immediately in front of the pusher plate 50. The shape of the surfaces 50a, 50b of the pusher plate 50, and the angle through which the latter is rocked in a forward direction, is such that the fuel present in the fire pot structure, at the time when the pusher plate begins its retraction movement (from dotted line position, Fig. 5), remains substantially in position, without crumbling and falling into the space provided by this retraction of the pusher plate 50. Further, this shape of the pusher plate 50 is advantageous, as a slight component of downward effort is being exerted against the fuel at the top of the fire bed, to assist in assuring a rocking movement of the fire pot structure and its contents at the proper time.

When the pin 83 completes this movement for retracting the pusher plate and moving the carriage, the continued movement of the shaft 75 causes it to again exert an effort upon the link 84 tending to move the pusher plate 50 again in the relatively counterclockwise direction. This course of movements continues until a sufficient volume of fuel has been introduced into the fire pot, and advanced therealong, so that the weight is sufficient to cause the counterclockwise rocking of the fire pot structure about the axis of the rod 38, wherewith the detent lever 121a is permitted to engage with the arm 51s and stop the same, together with the pusher plate 50 and rod 38 and prevent the return of these structures into the retracted position. It will be noted that this detention occurs, in the illustrated form, when the pusher plate 50 is in its forward position, so that the weight thereof is essentially at the left of the upright plane through the axis of the rod 38. This detention of the rod 38, further, has the effect of preventing movement of the link 84, and thus the shaft 75 is brought to a standstill.

The combustion of the fuel results in a lessening of the weight of the contents of the fire pot, so that ultimately this weight is insufficient to overcome the spring 35s, and the latter then moves the fire pot structure in a clockwise direction about the axis of rod 38, and the lug 126 operates to disengage the detent lever 121a from the arm 51s, and the pusher plate is thus permitted to be retracted by a further movement of the shaft 75, and a fresh charge of fuel is deposited in front of it by the operation of the carriage as aforesaid. Thus, the operation is fully automatic, and continues as long as there is energy available from the weight W in the illustrated form, and so long as fuel is present in the hopper magazine.

Any clinkers which may form adjacent the fire bars 35a are immediately pushed along these bars, in the leftward direction, by the action of fresh fuel behind them and under the urgency of the pusher plate 50. As upper parts of the fuel bed burn away, the constant torque effect at the rod 38 results in a greater and greater proportion of this torque being exerted at the lower edge of the pusher plate 50, as this edge is close to the axis of the rod 38, and hence the clinkers are being continually advanced downwardly along the fire bars 35a, as there are no structures along these fire bars which interrupt such movements. These clinkers are thus being broken up or pushed along until they are definitely discharged at the lower ends of the fire bars 35a at the space betwen the same and the end wall 22a. Loose ashes can fall through the grate in regular progression along the length of the same.

This operation continues in cycle, with the feeding of fresh coal at each return movement of the pusher plate 50, and with a forward movement of the pusher plate 50 determined by the presence of the material in the fire box, and in proportion to the combustion occurring.

It is preferred to have all walls and joints tightly sealed, so that air may only enter at the desired points and in the desired amount. For maintaining a draft, it is preferred, in this illustrative form, to provide an air damper 100 which is mounted by a pivot 101 opposite a suitable air opening and controlled by the movable wall 102 of a conventionally-shown thermostatic bellows 103, this bellows being actuated through a conduit 104 from a thermostatically sensitive bulb 105 which may be located in the water storage tank WT which is connected to the water connections 25 and 26, in the usual way. When the temperature of the water, in this illustrative showing, reaches a predetermined maximum, the thermostat system is effective for closing the air damper 100 and thereby shutting down the amount of air which is available for combustion at the furnace structure; while an opening movement of the damper is occasioned at a lower temperature in the water storage tank WT. In this way, an automatic external control of the rate of combustion may be effected.

It has been found that a desirable size for heating water provides a capacity of four or five pounds of coal in the fire pot, and then the variation of the quantity of fuel in the fire pot never exceeds a pound, under the various conditions of operation of the structure, and that a wholly uniform operation can be produced when the quantity delivered for each feeding operation is about one pound. Since the presence of a predetermined amount of fuel in the fire pot is being employed for determining the feeding of fresh fuel, and since the pressure plate operates to advance the material in the fire pot, a coal bed of uniform depth is easily maintained. It is desirable to provide an ash pan 17 having a capacity sufficient to receive the ash from the fuel contents of the magazine and fire pot, and then the device will operate without attention over a considerable period of time, as it is only necessary to remove ash each time that the magazine is filled. This further assures regularity of operation, as the desired type of draft can normally be assured between the feeding operations.

In a particular structure, it was found that less than twenty inch-pounds torque is sufficient for maintaining the proper rate of movement of the pusher plate.

When the automatic control shuts off the damper 100, the device becomes sealed, and the consumption of fuel is extremely low. A fire can then be maintained, under idling conditions, for many hours, and yet is subject to immediate resumption of operation when the control operates to admit further air of combustion. Under full load, part load, or idling condition, the pusher plate operates, and is controlled by the quantity of fuel in the fire pot structure, so that the consumption occurs throughout under the regulated conditions as aforesaid.

It has been found advantageous to employ a small passage 107 between the supply channel and the upper arch of the dome structure, in order to assure that any gases of distillation are passed to the chimney, through the flue 29a, and are not caused to escape into the apartment.

The extreme positions of operation of the structure are indicated in full and dotted lines in the figures, the full line position of the fuel feeding parts in Figs. 1, 2 and 5 indicating the same in the withdrawn position of the pusher plate 50 and in the position of the fuel feeding carriage at which fuel has just been delivered into the supply channel: while the dotted line positions thereof indicate these parts with the pusher plate 50 in its fully advanced position, and the carriage in the fully retracted position in which the latter is receiving a fresh supply of fuel. Likewise, in Fig. 5, the full line position of the fire bars 35a and side walls 20 indicate these parts when a "maximum" quantity of fuel is present in the fire pot: and the dotted line position shows these parts when they have been raised under the action of spring 35s when a "minimum" quantity of fuel is present.

Certain features set out in the present specification and drawings are likewise disclosed, and are claimed, in the copending application of Hugh W. Sanford, Serial No. 136,492, filed April 12, 1937.

It is obvious that the invention is not limited solely to the form of the construction shown, but that it may be modified in many ways within the scope of the appended claims.

I claim:

1. An automatic feeding furnace comprising a furnace structure including a fuel supporting bottom portion, a hopper for fuel and having a discharge opening disposed remotely from the fuel supporting bottom to prevent coking of fuel in said hopper as a result of heat from fuel burning on said bottom, means for guiding fuel discharged from said opening onto said supporting bottom, a cyclically movable feeder device for taking fuel from said discharge opening and preparing and delivering a predetermined amount of fuel to said guiding means at each cycle of movement of the feeder device, pusher means for advancing the fuel along the fire bed on the bottom portion, actuating devices for said pusher means rendered alternately active and inactive directly responsive to the quantity of fuel mass on the bottom portion, and power means for synchronously actuating the feeder device and the pusher means so that the fuel is delivered by gravity through said guiding means into the space immediately in advance of the pusher means.

2. An automatic feeding furnace comprising a furnace structure including a fire box with a discharge opening at one end, an element movable along the fire box toward and from the discharge opening and effective during movement toward the opening to advance the contents of the fire box and during movement away from the opening to establish a space between itself and the solid contents of the fire box, means for supplying fresh fuel into said space including a feeder structure for preparing substantially predetermined quantities of fuel always less in volume than said space and a guide means separate from the fire box for directing the prepared quantity by gravity into said space, and power-driven means for cyclically moving said element and said feeder device whereby each fuel charge is gravitationally delivered only when the element has been moved to clear a space for said fuel, said power-driven means being constructed and arranged for causing said element to move slowly in the fuel advancing direction under control of fuel mass resistance and causing said element to move relatively rapidly in the space-establishing direction in which movement of said element is not resisted by fuel mass.

3. An automatically fed furnace including a bottom portion for receiving a fire bed, a reciprocable pusher member having a face for engaging fuel in the fire bed and effective for advancing the same along the bottom portion, closure walls for closing a fire space above said grate means and including spaced side walls and a gravity chute wall along which fuel is delivered to the bottom portion at a point between the fuel in the fire bed and said pusher member when the latter is being retracted, said pusher member also having an upper wall portion which moves adjacent the lower end of the chute wall and between and adjacent said side walls and is effective in conjunction with said pusher member and said side walls for sealing said fire space while the member moves, means for cyclically moving said member, and a feeder means synchronized with said pusher member for preparing quantities of fuel and effective to deliver the same along said chute wall only at times when the member is in retracted position.

4. An automatic feeder for a furnace having a furnace structure with an ash discharge, comprising a hopper for fuel and having a discharge opening, a cyclically movable feeder structure for taking fuel from said discharge opening and preparing and delivering at each cyclic movement a quantity of fuel of predetermined amount, guide means for receiving the fuel from the feeder structure and delivering it into the furnace structure at a point horizontally displaced from said ash discharge, power-driven means for cyclically moving the feeder structure, means responsive to the weight of fuel in the furnace structure for controlling the movement of said feeder structure, a fuel advancing element effective for horizontally displacing fuel from the point of reception in the furnace structure towards said ash discharge during at least part of the portion of the cycle of movement of said feeder structure at which no fuel is being delivered into the furnace structure, and devices actuated by said power-driven means for imparting movement to said fuel controlled by said weight responsive means and advancing element.

5. An automatic feeding furnace comprising a furnace structure including a fuel supporting bottom portion, a hopper for fuel and a feeder device located at a higher level than the furnace structure for preparing and delivering predetermined amounts of fuel so that each said amount will be moved by gravity onto the bottom portion, power-driven means for advancing the fuel along the fire bed on the bottom portion and including a pusher member and actuating devices therefor rendered alternately active and inactive directly responsive to the quantity of fuel mass on the bottom portion, means operated by the power-driven means for actuating the feeder device synchronously with the pusher member so that the fuel is gravitationally delivered onto the bottom portion immediately in advance of the pusher member, and means for guiding each said amount of fuel into the space between the pusher member and the fuel already present on the bottom portion.

6. An automatic feeding furnace comprising a furnace structure including a fuel supporting bottom portion, a hopper for fuel and a feeder device located directly above and within a common casing with the furnace structure for preparing and delivering predetermined amounts of fuel so that each said amount will be moved by gravity onto the bottom portion, heat-insulating means between the feeder device and furnace structure for preventing coking of coal in said hopper and feeder device, power-driven means for advancing the fuel along the fire bed on the bottom portion and including a pusher member and actuating devices therefor rendered alternately active and inactive directly responsive to the quantity of fuel mass on the bottom portion, means operated by the power-driven means for actuating the feeder device synchronously with the pusher member so that the fuel is gravitationally delivered onto the bottom portion immediately in advance of the pusher member, and chute means for guiding each said amount of fuel into the space between the pusher member and the fuel already present on the bottom portion, said guiding means including a wall separating the furnace structure from the chute for preventing coking of the fuel prior to its reception in the furnace structure.

7. An automatic feeding furnace having a furnace structure, a hopper for fuel and having a discharge opening, a carriage reciprocable below the hopper discharge opening, said carriage having upper and lower platforms and upper and lower feeder walls, heat insulating means separating said platforms and walls from the furnace structure for preventing coking on said platforms, power-driven means for reciprocating the carriage, said furnace structure having a supply chute with an upper fuel delivery opening and a fuel-receiving plate adjacent said opening, said platforms and upper feeder wall being effective for withdrawing fuel from the hopper during the reciprocating movement of the carriage and preparing the same in predetermined quantity upon said fuel-receiving plate, said lower feeder wall being effective for pushing the prepared quantity of fuel from said plate into said opening, means responsive to the amount of fuel in the furnace structure for controlling the movement of said power-driven means, and a fuel advancing device operated by the power-driven means also under control of said responsive means and effective for horizontally displacing fuel in the furnace structure during portions of the cycle of movement of said carriage when fuel is not being delivered through said supply chute.

8. In an automatically feeding furnace, a fuel supporting bottom portion, a hopper for solid fuel and having a discharge opening, means for guiding fuel discharged from said opening onto said supporting bottom portion, feeding means for feeding measured amounts of fuel from said opening to said guiding means, and a movable gate means adjacent said opening for partially defining the same and effective in determining the amount of fuel being fed, said gate means comprising a plurality of individually-movable yieldably-mounted narrow-width gate members which are individually movable by large lumps of fuel to permit delivery of such lumps without clogging while maintaining the gate means effective for preventing unrestricted passage of small fuel particles.

9. An automatically fed furnace including a fuel supporting bottom portion for receiving a fire bed, a rockable pusher member for advancing fuel along said bottom portion, said bottom portion having its upper surface concentric with the axis of said pusher member and located closely adjacent the lower end of said pusher member, the lower end of the pusher member being beveled rearwardly away from said surface, and means for moving said member.

10. In a furnace of the character described, a fire pot including a grate surface, an oscillatable pusher member for advancing fuel in the fire pot, and means including a gravity chute for feeding fuel to a position between the fuel already in the fire pot and said member when the latter is in withdrawn position, said member being pivoted at a point slightly below said grate surface and having a portion thereof disposed in close wiping relation to a portion of said surface for feeding clinkers therealong.

11. An automatically fed furnace including a bottom portion for receiving a fire bed, and including an ash discharge at one end, means for feeding fuel to a point of the bottom portion horizontally spaced from the ash discharge and including means for preparing pre-determined amounts of fuel and delivering each said amount to said point, an upstanding rockable member having a face for engaging fuel in the fire bed and constituting the sole means for advancing the same along the bottom portion, from the fuel feeding point toward the ash discharge, said bottom portion having a surface concentric with the axis of movement of the rockable member, the rockable member having a beveled edge which is adjacent said concentric surface and is movable therealong as the member is rocked, the beveled edge being closer to the surface at said face than at the other side of the member, and means for moving said rockable member.

12. An automatically fed furnace including a bottom portion for receiving a fire bed, spaced upright walls extending upward from the bottom portion, a rockable member having a face for engaging fuel in the fire bed and effective for advancing the same along the bottom portion, said face substantially closing the space between and to the full depth of said walls and above the grate means, the edges of said members being beveled whereby to provide increasing clearance rearward of said face, and means for preparing and delivering fuel in pre-determined amounts onto the bottom portion at a point thereof immediately in front of said member, said preparing means being constructed and arranged for operation by said moving means so that the fuel is delivered to the bottom portion only when the member has moved to clear a space for it whereby deposit of fuel upon or coking of fuel on horizontal surfaces of said member is avoided.

WILLIAM P. BIDDLE, Jr.